(12) United States Patent
Übelhor

(10) Patent No.: US 6,379,539 B1
(45) Date of Patent: Apr. 30, 2002

(54) POINT OF ENTRY WATER TREATMENT SYSTEM

(76) Inventor: Eric Übelhor, 12019 Arbor Run Dr., Walton, KY (US) 41094

( * ) Notice: Subject to any disclaimer, the term of this patent is extended or adjusted under 35 U.S.C. 154(b) by 0 days.

(21) Appl. No.: 09/521,302

(22) Filed: Mar. 9, 2000

(51) Int. Cl.$^7$ .................................................. C02F 9/00
(52) U.S. Cl. ........................ 210/104; 210/105; 210/143; 210/202; 210/205; 210/257.1; 210/258; 210/259; 210/266
(58) Field of Search .................................. 210/688, 669, 210/694, 143, 202, 203, 257.1, 258, 259, 266, 416.3, 104, 105, 205, 241

(56) References Cited

U.S. PATENT DOCUMENTS

| | | | | |
|---|---|---|---|---|
| 4,314,906 A | * | 2/1982 | Dunn et al. .................. 210/694 |
| 4,367,145 A | | 1/1983 | Simpson et al. ............. 210/241 |
| 4,659,460 A | | 4/1987 | Muller et al. ................. 210/93 |
| 4,816,149 A | | 3/1989 | Wekell ...................... 210/257.2 |
| 5,190,659 A | | 3/1993 | Wang ......................... 210/663 |
| 5,308,482 A | * | 5/1994 | Mead ....................... 210/416.2 |
| 5,399,260 A | | 3/1995 | Eldredge et al. .............. 210/87 |
| 5,547,584 A | * | 8/1996 | Capehart .................... 210/669 |
| 5,589,066 A | | 12/1996 | Gray ......................... 210/258 |
| 5,607,593 A | | 3/1997 | Cote et al. ................. 210/650 |
| 5,954,963 A | | 9/1999 | Matheson ................... 210/606 |
| 5,972,216 A | | 10/1999 | Acernese et al. ........... 210/253 |
| 5,997,750 A | | 12/1999 | Rozelle et al. .............. 210/744 |

* cited by examiner

*Primary Examiner*—Ivars Cintins
(74) *Attorney, Agent, or Firm*—R. Christian Macke

(57) ABSTRACT

A point of entry water treatment system. Components mounted on a base frame are interconnected and provide a system and method for treating freshwater, including from a lake, river, well or cistern, to provide potable water. A pre-filter removes sediment and reduces turbidity, followed by chlorine disinfection of the water. Finally, the water passes through an activated carbon filter to remove remaining free disinfectant and by-products resulting from the application of the disinfectant. Controls are provided that prevent untreated water or raw disinfectant from being output by the system. The controls also dampen the cycling of the system major components to reduce wear and maintenance.

8 Claims, 3 Drawing Sheets

POINT OF ENTRY WATER TREATMENT SYSTEM

FIELD OF THE INVENTION

This invention relates to a system and method for treating water acquired from a freshwater source to generate potable water.

BACKGROUND OF THE INVENTION

Drinking water is one of the fundamental requirements of any civilization, much effort has gone into the development of devices and methods for generating and refining drinking water. As civilization has progressed, the quality and availability of safe drinking water has improved dramatically. While it is often no longer necessary for individuals to arrange for their own procurement and treatment of water to make it safe for drinking, insofar as those functions are available through a municipality or other government entity or a private entity, there does remain a need to provide systems and methods for the treatment of water to remove impurities. This need is especially pronounced in underdeveloped regions and countries and in times of drought. For those regions or countries wherein the government cannot afford or chooses not to provide, regulate and maintain a system to treat water to provide drinking water, it is desirable to provide a system and method whereby water from freshwater sources, such as lakes, streams, ponds, rivers, etc., can be accessed and treated to provide safe drinking water.

Even for areas in which a governmental or private entity is treating water to remove impurities and to make the water safe for human consumption, it is desirable to provide a system and method to remove impurities, which often include chemicals added by the government or private entity treating the water. Specifically, while tap water has been treated by the government or private entity to make it safe, typically through the addition and blending of chemicals into the water, often those chemicals, while not being unsafe or posing any health risk, give the water a bad taste or odor and may cause residual impurities to form. The dramatic increase in sales of bottled water, and in fact the growth of a whole industry providing pure water without impurities and with improved taste, demonstrates the undesirability of treated tap water as drinking water. Thus, to further refine the water available from a government or private entity engaged in the treatment and purification of water, it is desirable to provide a point of entry system and method to remove impurities that remain after treatment by a governmental or private entity.

As the population of the United States continues its migration away from urban centers toward more rural settings, it becomes more costly for the government to extend its services, including the provision of water. Real estate development continues to occur in areas in which water is not available from a government or private entity, and in those cases homeowners must have provisions for accumulating water, such as in a cistern or from a well, and treating the water to remove impurities. It is thus desirable to provide a point of entry water treatment system and method to treat and remove impurities from water retained in a cistern, well, or other storage device.

Many of the prior solutions directed to the generation of potable water have been concerned with the treatment of saltwater to remove salt therefrom to make it into drinking water. The chemical treatment is dramatically more complex than that required for the treatment of freshwater. The present invention is directed solely to the treatment of freshwater and does not concern itself with saltwater.

Recreational activities have also created a need for a system and method for treating freshwater to remove impurities and to provide potable water that is free of any of the negative effects of the treatment, including the odor and taste of chemicals used in the treatment. Applications of such a point of entry water treatment system and method include use while boating on a lake, river or other freshwater body of water. Another application is use by campers or military units in the field in which a point of entry water treatment system is desirable that turns a freshwater source in a remote environment into potable water free of the negative odors and tastes of the chemicals and devices used in the treatment of the water.

Because of the multiple applications available for a point of entry water treatment system that treats freshwater to provide potable water, it is desirable that such a system be provided that is adaptable to a variety of circumstances. It would be advantageous, for example, to provide a single system and method for treating freshwater to generate potable water that can be applied to a house to provide drinking water for the residents thereof, while also being capable of being applied to a boat or field campsite in close proximity to a freshwater source.

Previous attempts to provide a system for treating water to provide potable water have typically included the use of reverse osmosis involving passing water through a semi-permeable membrane, particularly in those systems that include application of a disinfectant, such as chlorine, in the treatment of the water. The use of reverse osmosis is disadvantageous, however, because the rate at which water is processed thereby, i.e. passes through the membrane, is very slow and is directly proportional to the cross-sectional area of the membrane through which the water is being treated. To generate the throughput necessary to provide a supply of drinking water to a family, a membrane having a very large cross-sectional area is required. It is thus desirable to provide a point of entry water treatment system and method that continuously treats fresh water, including provisions for mixing a disinfectant with the water and allowing sufficient residence time for the disinfectant to work, without limiting the throughput of the system.

Because the use of chemicals, particularly disinfectants such as chlorine, may be damaging if injested in too great a concentration, it is also desirable to provide means for controlling the disinfectant added to untreated water to ensure that system output cannot erroneously output water with too great a concentration of disinfectant.

There is thus identified a need for a point of entry water treatment system and method that provides adequate potable water throughput at acceptable pressure and which is sufficiently flexible and adaptable for use in homes having city water; in homes that do not have city water; on freshwater boats; and at camp sites, military or other field installations.

OBJECTS OF THE INVENTION

It is an object of the present invention to provide a point of entry water treatment system that outputs an acceptable volume of water that has been treated to remove impurities while being relatively portable and adaptable to a variety of uses.

It is another object of the present invention to provide a point of entry water treatment system that is modular and performs three steps of treatment to water including pre-filtering to reduce turbidity, chemically disinfecting using diluted sodium Hypo-chlorite, and post-filtering to remove free chlorine, chlorine by-products resulting from the disinfecting, and other impurities not affected by the disinfecting process such as pesticides and volatile organic chemicals.

It is yet another object of the present invention to provide a point of entry water treatment system having interlocking controls to prevent raw disinfectant or untreated water from exiting the system.

It is a further object of the present invention to provide a point of entry water treatment system adaptable to provide potable water on a boat; in a home to treat cistern water, well water or city water; or at a camp-site or military installation to treat freshwater in the field.

It is a further object of the present invention to provide a system to generate potable water from a freshwater source utilizing two filters and chemical disinfection.

It is yet another object to provide a method for the treatment of fresh water to produce potable water free of impurities and free of disinfectants used in the treatment thereof.

These and other objects and advantages of the present invention will be apparent from a review of the following specification and accompanying drawings.

SUMMARY OF THE INVENTION

The present invention comprises a point of entry treatment system for fresh water that provides a pre-filter means for reducing turbidity in the water, means for applying a disinfectant to the water, and post-filter means for removing disinfectant and disinfectant by-products resulting from applying the disinfectant to the water. The means for applying a disinfectant is continuous and further comprises an in-line mixer and a mixing tank. By making the process continuous and not relying upon the passage of water being treated to pass through a membrane, as in a reverse osmosis system, the speed of processing water is greatly enhanced.

The means for applying a disinfectant further comprises a main pump transferring untreated fresh water from a source to the pre-filter means and a metering pump injecting a disinfectant into the flow stream ahead of the in-line mixer, the disinfectant being thoroughly mixed in the in-line mixer along with water exiting the pre-filter means to ensure complete contact with the disinfectant. The control means of the system are designed to allow only treated water to exit the system and comprises interlocking co-dependent permissive circuits between the main pump and the metering pump. By having the circuits interlocking and co-dependent, it is impossible to have one running without the other, so there is no danger of outputting untreated water.

The disinfectant of the most preferred embodiment of the present invention is sodium Hypo-chlorite and the post-filter means comprises an activated carbon filter.

In a significant feature of the present invention, the system for treating fresh water comprises a modular system wherein all components are mounted to and within a frame. This gives the present system the capacity to be easily moved from site to site, an extremely pertinent feature for campers and military, and it also can readily be applied to a boat to generate clean water free from impurities from murky lake or river water.

In another significant departure of the present invention from the prior art a pressure tank is provided for in line storage of water that has been disinfected and allows periodic cycling of said main pump so that on and off transitions occur less often. The pressure tank is particularly advantageous because it dampens out the repetitive on and off cycling of the main pump, thereby extending the life of the pump and, indeed, of the whole system.

A method for treating water to generate potable water is also disclosed herein, the method including the steps of applying water acquisition means to bring in water, followed by passing the water through a sediment filter to reduce turbidity. Next, the water is mixed with a disinfecting chemical to neutralize impurities remaining in the water after which the water is transferred to the mixing tank in which it will remain for at least 20 minutes. Finally, the water is passed through an activated carbon filter, preferably a Granular Activated Carbon (G.A.C.), filter to remove free chlorine remaining in the water and to separate out the chlorine by-products.

The present invention is advantageous over the prior art in several ways. First, it provides a relatively portable water treatment system that removes not only the sediment, but also chemically treats the water and then significantly reduces the chemical, chlorine, and all of its byproducts remaining after passing through the G.A.C. filter. Second, the control of the system ensures that only treated water will exit the system by interlocking the controls between the main pump and metering pump.

The third distinguishing characteristic of the present invention is that, by including a pressure tank in the system, excessive cycling of the main pump is eliminated because the pressure tank and a related pressure switch operate the system within a range of pressures, so that the main pump will run to fill the pressure tank and pressurize the system. Water is then used out of the system to deplete the contents of the pressure tank first, thereby reducing pressure in the system, and, when the system pressure falls below a minimum set point, the main pump and metering pump will turn on to re-fill the pressure tank. Once the pressure tank is re-filled and the system re-pressurized, the pumps are turned off and await the next cycle.

DETAILED DESCRIPTION OF THE INVENTION

Figure 1:
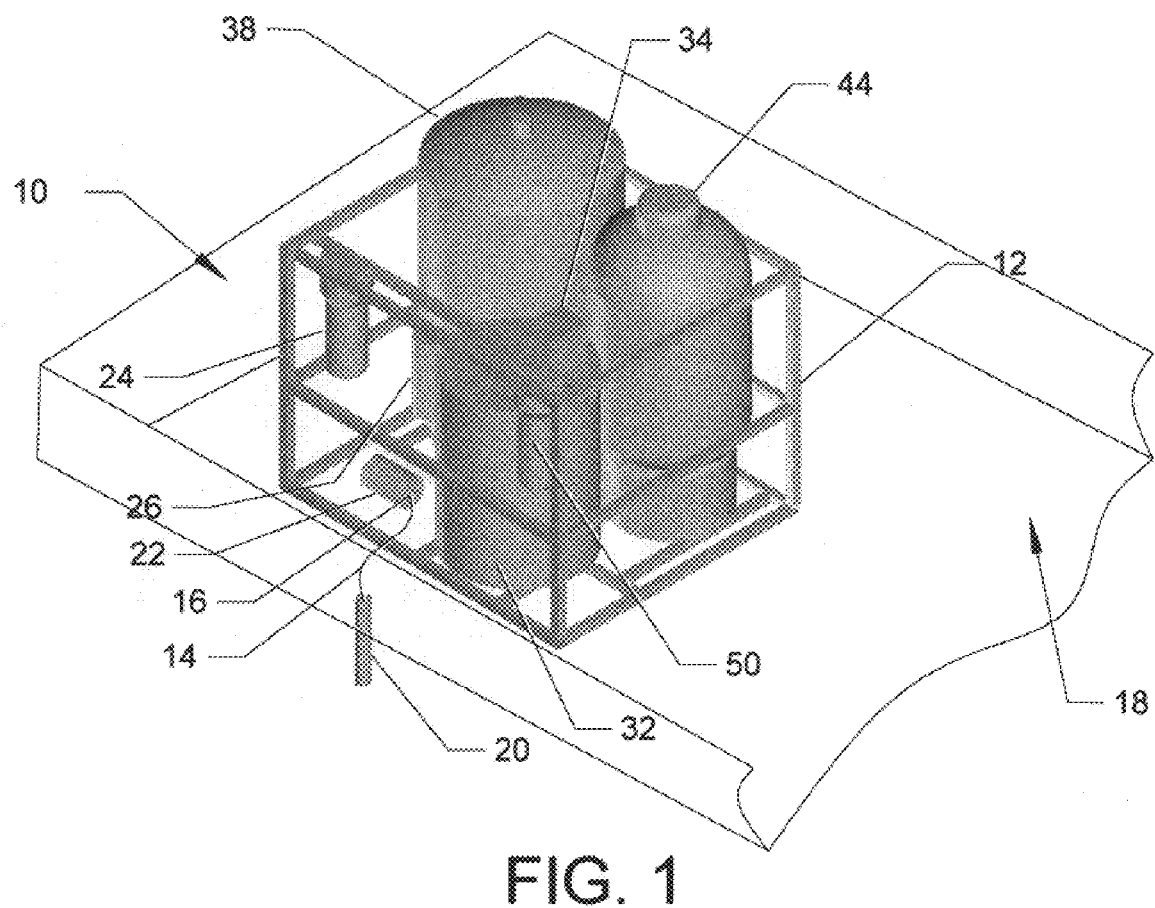
FIG. 1 is a perspective view of the point of entry water treatment system attached to the water inlet of a boat.
Figure 2:
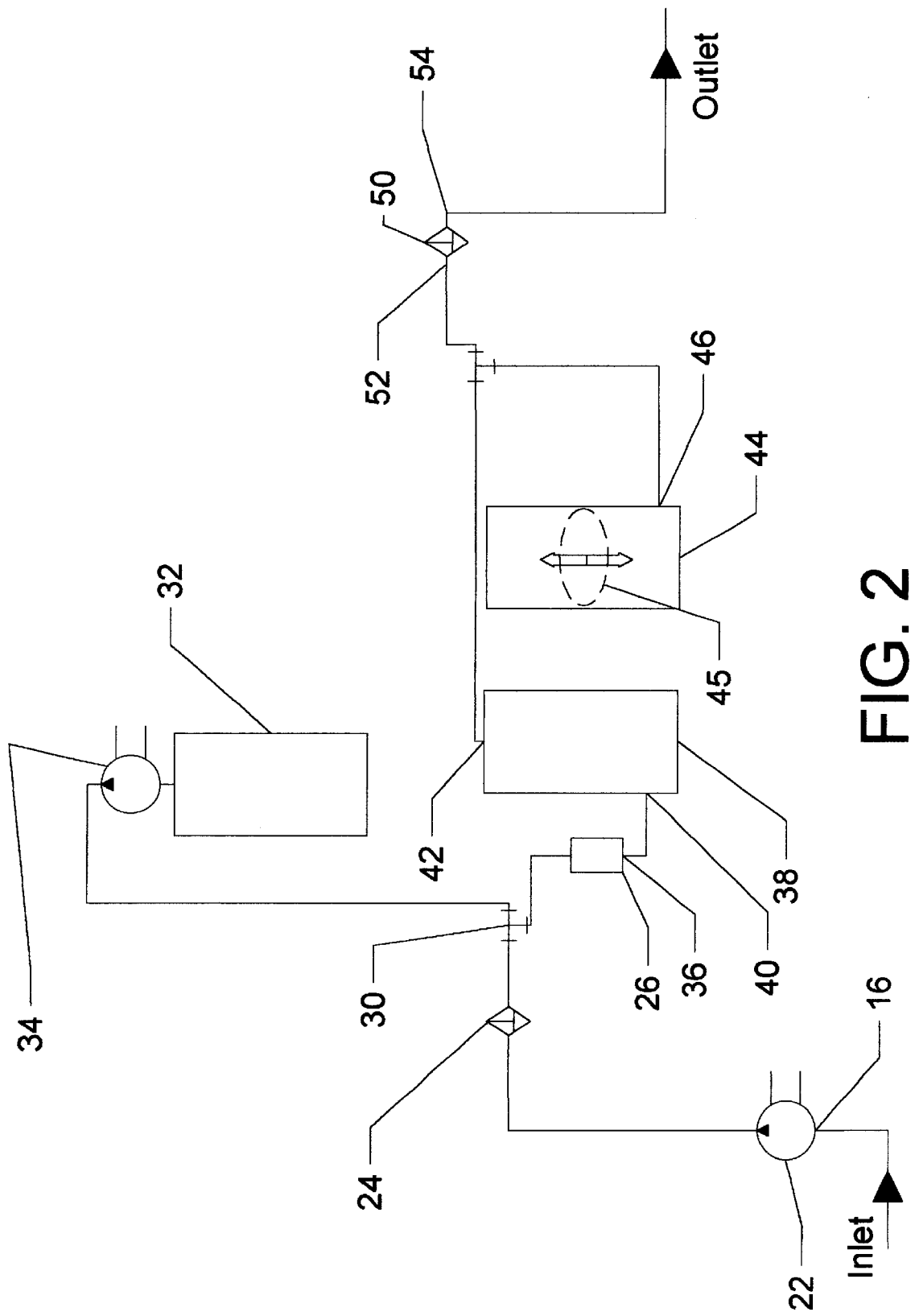
FIG. 2 is a schematic reflecting the flow of water through the various components of the water treatment system.

The present invention comprises a water treatment system 10 which treats freshwater to provide potable water, as set forth in more detail below. The components of the water treatment system 10 are mounted in a frame 12 which makes the system 10 modular, thereby facilitating quick and easy movement and application for use in a home, or in conjunction with a boat, camp, military or other domestic or field applications in which freshwater is required. The water treatment system 10 is attached to and accesses a freshwater source at input line 14. A standard fitting 16 provides a means for quick connection to a boat's water inlet line 20. While FIG. 1 illustrates the use of the water treatment system 10 of the present invention with a boat, it is specifically contemplated that the system 10 is applicable to access freshwater sources such as a lake, river or stream, as well as a cistern or even incoming city water line coming into a home. When the water treatment system 10 is used in a home or at a camp site or military field site, extension hoses and coupling devices that are well known in the prior art are applied to extend water input line 14 as necessary to access a fresh water source.

Water is brought into the water treatment system 10 from a freshwater source. As shown in FIG. 1, the water treatment system 10 is resident on a boat 18 and the freshwater source is a lake or river that is accessible through the water inlet line 20 of the boat 18. FIG. 1 reflects the location and positioning of the components of the water treatment system 10 on the boat 18, but it does not show the piping interconnections between them. The main pump 22 of the water treatment system 10 draws the untreated water from the freshwater source and passes it into a sediment pre-filter 24. In the most preferred embodiment of the present invention the pre-filter 24 comprises a means for decreasing the turbidity of the water passing therethrough.

The next step in the processing of the water is the disinfectant step wherein a means for applying disinfectant is used to treat the water. Specifically, out of the pre-filter 24, the water being processed passes through an injection point 30 and at which disinfectant is joined with the water and passes into an in-line mixer 26. In the most preferred embodiment, the disinfectant comprises diluted sodium Hypo-chlorite which is injected into the water at injection point 30 from disinfectant tank 32. While diluted sodium Hypo-chlorite is used in the most preferred embodiment, other disinfectants may be used and are specifically contemplated such that use thereof is not a departure from the principles of the present invention. A metering pump 34 draws disinfectant, diluted sodium Hypo-chlorite in the most preferred embodiment, from the disinfectant tank 32 and passes it into injection point 30 just upstream of the in-line mixer 26. The metering pump 26 provides the means for controlling the amount of disinfectant added to the water being treated. Specifically, diluted liquid sodium Hypo-chlorite from the disinfectant tank 32 is added in the proper ratio to the amount of water flowing into the injection point 30 upstream of the in-line mixer 26 to ensure that a reaction with chlorine in the diluted sodium Hypo-chlorite occurs with all the impurities in the water without applying so much disinfectant that a large amount of free chlorine remains after disinfecting the water.

The in-line mixer 26 rapidly stirs and thoroughly mixes the water being treated with the disinfectant entering at injection point 30. The water/disinfectant mixture exits the in-line mixer 26 at outlet 36 and passes into the mixing tank 38 at inlet 40. The in-line mixer 26 and mixing tank 38 allow continuous processing of water and, along with the rest of the system 10, filters out impurities without the use of a membrane or the process of reverse osmosis. In the most preferred embodiment of the present invention the mixing tank 38 comprises a forty (40) gallon tank. This is specifically designed in order that the desired throughput of two (2) gallons per minute can be achieved while providing 20 minutes residence time in the mixing tank 38. This residence time is necessary to ensure that the disinfectant fully reacts with the impurities and thereby disinfects the water being treated. The water/disinfectant mixture exits the mixing tank 38 at outlet 42 and enters a pressure tank 44 at inlet 46. While the pressure tank 44 is not necessary for the operation of the system 10, its use is advantageous because it provides in line storage for water that has been disinfected and because it alters the cycling of the main pump 22 so that the on and off transitions of the main pump 22 occur less often and the main pump 22 is both on and off for longer periods of time. The life of the main pump 22 is extended as a result of the decreased cycling and sharply diminished number of on and off cycles that it must endure. As will be more fully explained herein, operation of the pump 22 is triggered only when pressure in the system 10 reaches a minimum set point. When the system 10 is fully pressurized to a maximum pressure set point, the main pump 22 is shut off and will not operate until the pressure drops back down to the minimum set point. The most preferred embodiment of the present invention utilizes a maximum set point of 40 PSI and a minimum set point of 20 PSI, although deviation from those set points is clearly anticipated so that a modification thereof does not avoid the principles of the present invention. The pressure tank 44 is beneficial in this regard because it dampens the rapid on and off cycling of the main pump 22 and metering pump 26 caused by pressure highs and lows. As will be explained in more detail below, a diaphragm 45 in the pressure tank 44 rises and falls on the level of the water/disinfectant mixture therein, and is directly reflective of the pressure in the system 10. When the pressure tank 44 is full, and the system 10 is pressurized and the pressure is at its maximum set point, a pressure switch 102 opens that turns the pump 22 off. The pump 22 stays off until the water/disinfectant mixture contents of the pressure tank 44 are consumed to such an extent that the level in the pressure tank 44 and pressure in the system 10 fall until the pressure gets to the minimum set point. At that point, the main pump 22 is again cycled on and runs continuously until the pressure tank 44 is refilled and the system 10 is re-pressurized such that the pressure again reaches the maximum set point.

The water/disinfectant mixture exits the pressure tank 44 at outlet 48 and passes into an activated carbon filter 50 at inlet 52. In the most preferred embodiment of the present invention, the activated carbon filter 50 is a Granular Activated Carbon (G.A.C.) filter. As the water/disinfectant mixture passes through the activated carbon filter 50, remaining disinfectant and disinfectant by-products are absorbed, including impurities neutralized by the disinfectant. The result is that the water exiting the outlet 54 of the activated carbon filter 50, which is also the main output of the system 10 as a whole, comprises water that has had the turbidity reduced to improve the efficiency of the application of disinfectant, following which disinfectant is applied to neutralize impurities in the water, after which an activated carbon filter is applied to remove remaining free disinfectant and by-products formed during the application of the disinfectant of the water. The activated carbon filter also removes other contaminants not affected by the disinfectant such as pesticides and volatile organic chemicals (V.O.C.'s).

As discussed above, the preferred embodiment of the present invention comprises a point of entry water treatment system that removes impurities from water, thereby transforming water from a freshwater source into potable water suitable for drinking. Another preferred embodiment of the present invention comprises a related method for treating water to generate potable water. First, water acquisition means 22 are applied to acquire water from a freshwater source. Next, the water is passed through a sediment filter 24 to reduce turbidity. Reducing the turbidity of the treated water at this early stage reduces the impurities in the water and makes disinfectant applied to the water more effective. The next step in treating the water is to use an in-line mixer 26 to mix the water with a disinfectant chemical, comprising diluted sodium Hypo-chlorite in the most preferred embodiment, to neutralize impurities remaining in the water. Next, the water, mixed with the disinfectant, is transferred into a mixing tank 38 in which it will remain for at least 20 minutes. It has been established that 20 minutes is sufficient contact time between the water and disinfectant to neutralize and eliminate impurities remaining in the water. The next step in treating the water is to pass the water through an activated carbon filter 50 which in the most preferred embodiment of the present invention is a Granular Activated Carbon (G.A.C.) filter. The activated carbon filter 50 removes free disinfectant remaining in the water, and also separates out the by-products formed as a result of disinfectant reacting with impurities in the water.

Figure 3:
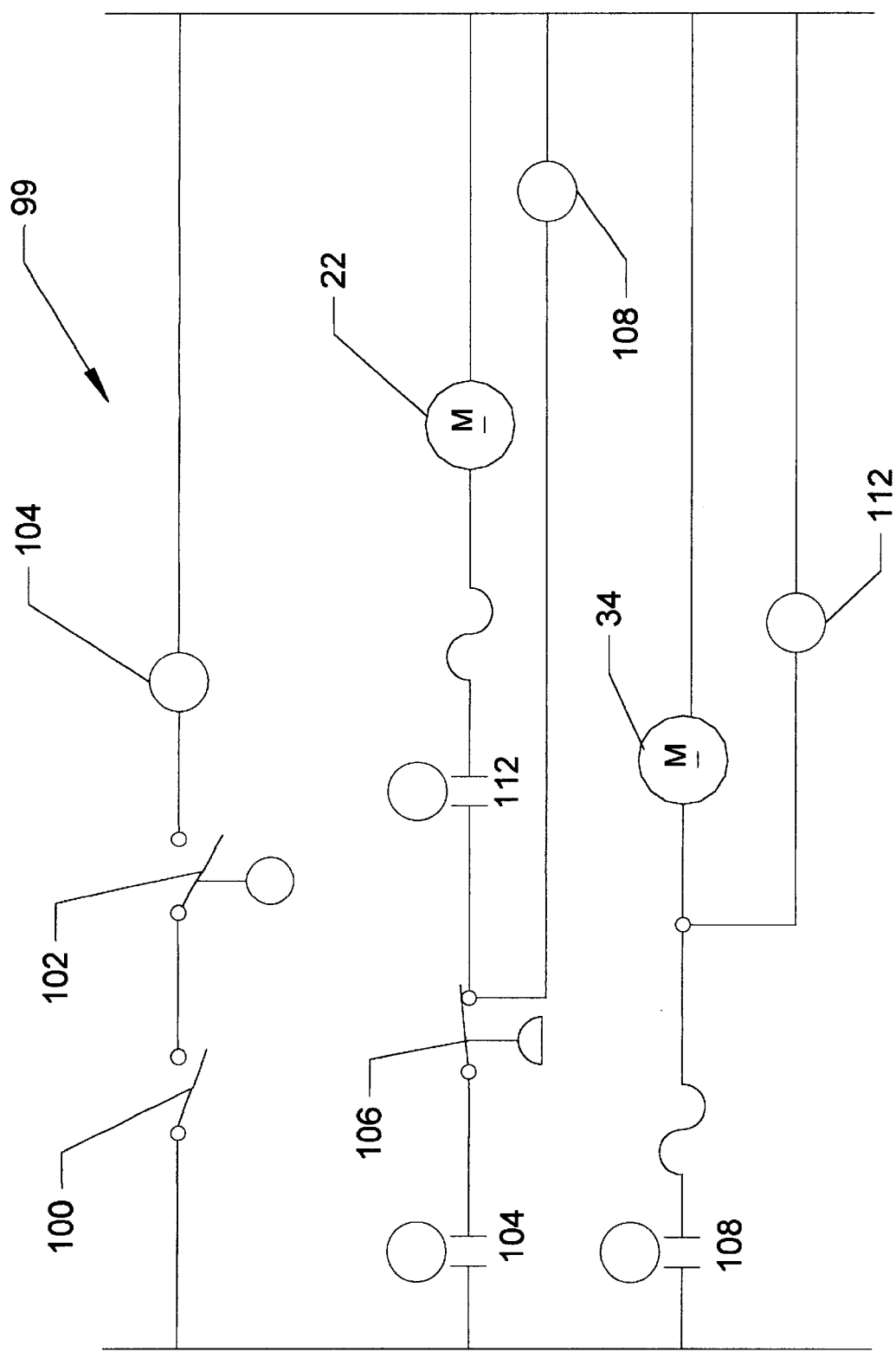
FIG. 3 is an electrical schematic pertaining to the control of the components of the water treatment system.

Control of the point of entry water treatment system 10 is effected as shown in the electrical schematic shown in FIG. 3. Specifically, upon closure of the system main switch 100, if the disinfectant level switch 102 is closed, permissive relay 104 is energized. That is, if the main switch 100 is closed and there is diluted sodium Hypo-chlorite in the disinfectant tank 32, resulting in closure of level switch 102, a first condition signified by relay 104 is satisfied. If this first condition is satisfied, and pressure switch 106 is closed, a second relay 108 is energized. Pressure switch 106 is normally closed and does not open until the pressure in the system 10 reaches a maximum set point which, in the most preferred embodiment of the present invention, is 40 PSI. When the pressure tank 44 is full, the system 10 is fully pressurized. Pressure switch 106 has a range of operation and, after opening at the maximum set point, does not close again until the system pressure reaches a minimum set point, which in the preferred embodiment of the present invention is 20 PSI. Thus, when the first condition is initially satisfied and relay 104 is energized, and there is no pressure in the system, so that pressure switch 106 is closed, a second condition is satisfied and relay 108 is energized. As is evident from FIG. 3, the energizing of relay 108 causes metering pump 34 to begin operating. In addition, relay 112, in parallel with metering pump 34, is energized which completes the circuit and causes the main pump 22 to operate. The main pump 22 and metering pump 34 will then continue operating until the system pressure reaches 40 PSI, the system maximum set point, and pressure switch 106 opens, at which point both main pump 22 and metering pump 34 cease to operate. The pressure 106 remains open until the system pressure drops to 20 PSI, the system minimum set point, at which time pressure switch 106 closes and the main pump 22 and the metering pump 34 again begin operating. This on and off cycling continues until disinfectant tank 32 is empty and level switch 102 opens, at which point additional disinfectant must be added to the system to resume operation.

The control means 99 for the system 10 described above activates main pump 22 and metering pump 34 at the same time and prevents them from operating independently. The control means 99 thus prevents the main pump 22 from injecting water into the pre-filter 24, as well as downstream components of the system 10, unless metering pump 34 is operating to inject disinfectant into injection point 30 and, downstream therefrom, in-line mixer 26. Similarly, the metering pump 34 will not inject disinfectant into the injection point 30 and in-line mixer 26 unless there is disinfectant in disinfectant tank 32 (level switch 102 is closed) and the system pressure is less than 40 PSI (pressure switch 106 is closed), the same permissives that are necessary to activate the main pump 22. Thus, the control means 99 prevents operation of the system 10 unless untreated water is being injected into the system. The control means 99 thus comprises interlocking permissive circuits between the main pump 22 and the metering pump 34 so that only treated water can exit the system because the water feed can not operate without the disinfectant feed.

The point of entry water treatment system 10 comprises a modular freshwater treatment system wherein all components are mounted to and within a frame 12 which facilitates the movement and application of the system to a variety of uses. While FIG. 1 depicts the mounting of the various components within the frame 12, interconnections between them are not shown. The most preferred embodiment of the present invention comprises frame mounted components, such as the main pump 22, pre-filter 24, disinfectant tank 32, metering pump 34, in-line mixer 26, mixing tank 38, pressure tank 44 and G.A.C. filter 50, but it is specifically contemplated that all of the components can be mounted on a plate or skid or other substrate that allows the entire system 10 to be moved as a unit, without departing from the principles of the present invention. The pre-assembled nature of the system 10 with interconnected components mounted on a frame 12 and a single untreated water input 14 and a single potable water output 54, is readily and quickly put into service with minimal installation requirements. This is particularly beneficial when the system 10 is transported from location to location and site to site, as is the case with campers or military field sites. The compact nature of the system 10, being fully contained within frame 12, is beneficial for portability if being transported, but it is also advantageous for use with a boat or in a home where floor space is at a premium.

I claim:

1. A point of entry treatment system for fresh water comprising:

pre-filter means for reducing turbidity;

means for applying a disinfectant to said water; and post-filter means for removing said disinfectant and by-products resulting from applying said disinfectant;

wherein said means for applying a disinfectant is continuous and further comprises an in-line mixer and a mixing tank;

wherein said means for applying a disinfectant further comprises a main pump drawing untreated water from a fresh water source to said pre-filter means and a metering pump injecting a disinfectant into said water at an injection point upstream of said in-line mixer, said disinfectant being mixed in said in-line mixer with water exiting said pre-filter means;

said point of entry treatment system further comprising control means allowing only treated water to exit said system; and wherein said control means further comprises interlocking permissive circuits between said main pump and said metering pump.

2. The point of entry treatment system for fresh water as set forth in claim 1 wherein said disinfectant comprises diluted sodium hypochlorite.

3. The point of entry treatment system for fresh water as set forth in claim 2 wherein said post-filter means comprises an activated carbon filter.

4. The point of entry treatment system for fresh water as set forth in claim 3 further comprising a modular system wherein all components are mounted to and within a frame.

5. The point of entry treatment system for fresh water as set forth in claim 4 wherein said water is mixed with said disinfectant and transferred into said mixing tank in which it will remain for 20 minutes.

6. The point of entry treatment system for fresh water as set forth in claim 5 further comprising a pressure tank providing in line storage for water that has been disinfected, said pressure tank altering cycling of said main pump so that the number of on and off transitions is decreased.

7. The point of entry treatment system for fresh water as set forth in claim 6 further comprising a level switch in a disinfectant tank preventing operation of said system if said disinfectant tank is empty.

8. The point of entry treatment system for fresh water as set forth in claim 7 further comprising a means for quick connection to a water inlet line.

* * * * *